July 6, 1965   W. C. RAY ETAL   3,193,415
BATTERY MARKING DEVICE
Filed Nov. 6, 1961

INVENTORS.
JOSEPH L. ROONEY
WILLIAM C. RAY
BY
Souther & Stoltenberg
ATTORNEYS 3,193,415
BATTERY MARKING DEVICE
William C. Ray, Toledo, and Joseph L. Rooney, Sylvania, Ohio, assignors to Eltra Corporation, a corporation of Ohio
Filed Nov. 6, 1961, Ser. No. 150,494
2 Claims. (Cl. 136—181)

This invention relates to storage batteries and more particularly to an internal coding device for storage batteries.

The invention contemplates a means for providing a storage battery with a serial or code number which is located internally of the battery to prevent deliberate or accidental destruction, loss, or disfigurement of the code number.

The invention provides a member formed of an acid-resistant insulating material which is imprinted with a permanent code number and suitably positioned inside of a storage battery during the battery construction and before the battery case is sealed.

Various methods have been devised by battery manufacturers to provide a storage battery with a device having a code or serial number printed thereon, so that the manufacturer can readily determine the exact age of a particular battery. This is necessary to make proper adjustments relative to battery guarantees, which usually involve a given length of time. Some of these devices have been loosely attached tags, and others have been exposed labels, or the like, positioned on the battery during the manufacturing process so as to be an integral part of the battery. In either case, they have been found unsatisfactory because they are located on the outside of the battery where they may be deliberately removed, either by tearing or breaking, or they may be altered in such a way as to provide false information. This is done to defraud the battery manufacturers when the battery fails after the guarantee period, which has become an increasing problem for the manufacturers and involves a considerable amount of money over a period of time. Also, if the code device is lost, as a result of becoming loose or accidentally broken, the user who presents a legitimate claim to the manufacturer is faced with the problem of proving such a claim.

In general, the manufacturer has required the return of the complete battery submitted for adjustment for failure, either to himself or to his agent, before an adjustment is considered. This is not a satisfactory solution, inasmuch as batteries are heavy and cumbersome objects to transport. The use of the external tags is not satisfactory, because the tags could be removed from perfect batteries and used to defraud the manufacturer to obtain a new battery for the first which was often serviceable. By positioning the tag on the interior of the battery, so that the cover or case of the battery must be destroyed to obtain the tag, these difficulties are obviated, and fraud on the manufacturer is made more difficult.

It is, therefore, a principal object of the invention to provide a code device for electric storage batteries which cannot be tampered with or removed, accidentally or otherwise, after the battery has been assembled by the manufacturer.

It is another object of the invention to provide a battery with a code device which is internally located and mounted in such a fashion to prevent damage to the internal elements of the battery during normal use and/or life of the battery.

Another object of the invention is to provide a code device, for internal mounting in a storage battery, which is formed of an acid-resistant insulating material to prevent disturbance of the normal electrolytic action of the battery and to prevent acidic destruction of the code member.

It is a further object of the invention to provide a code device positioned on the interior of the battery, so that the case or cover of the battery must be broken or destroyed to obtain the code device for adjustments under warranty agreements to thereby make fraud more difficult to perpetrate on the manufacturer.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

Referring to the drawings.

Figure 1:
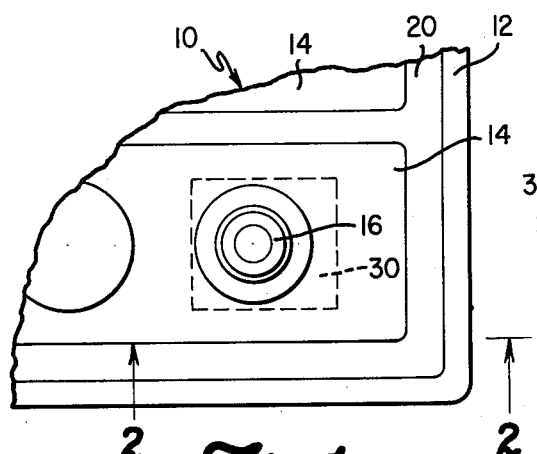
FIG. 1 is a top plan view of a portion of a conventional storage battery showing a preferred form of the invention in phantom.
Figure 2:
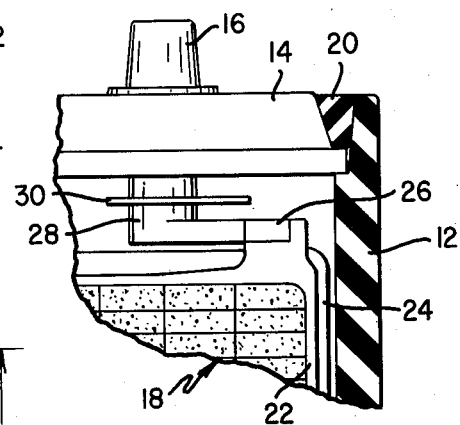
FIG. 2 is a view partly in section taken on line 2—2 of FIG. 1.

Referring to the drawings, particularly FIGS. 1 and 2, a portion of a conventional storage battery 10 is shown comprising a case 12, cover members 14, a terminal post 16, a cell element 18, and a sealing material 20. The cell element 18 comprises a number of plate members 22 with separators 24 positioned between the plate members. The plate members 22 are interconnected with a connecting-strap 26 which is provided with an integral upwardly projecting connecting-post 28. The post 28 eventually becomes an integral portion of the terminal post 16 during the construction of the battery. An electrolyte (not shown) is also included in a conventional storage battery, the required level of which is above the upper edge of the battery separators 24.

Figure 3:
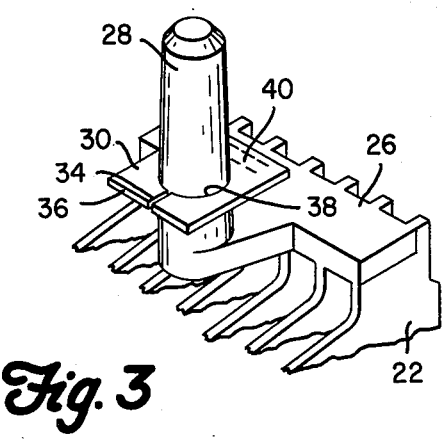
FIG. 3 is an isometric view showing a portion of a battery element with a code device positioned thereon.

The invention involves the use of a relatively thin code device 30 having a rectangular configuration and formed of an acid-resistant insulating material, such as plastic. The code device 30 is positioned within the battery case and preferably on the connecting-post 28 as shown in FIGS. 2 and 3. An aperture 32 is provided in the member 30 (FIG. 6), and also a separation 34 which extends from the aperture 32 to an outer edge 36 of the code device. The separation or slot 34 allows for a slight outward expansion of an annular edge 38 of the aperture 32, thereby providing a clamp-like action of the device when it is positioned on the post 28. The outward expansion will also permit removal of the device without it breaking, and the clamp-like action will prevent movement of the device during handling or general use of the battery.

The location of the code device with reference to the negative or positive post is immaterial, but consideration must be given to the diameter of the aperture 32 in the device with relation to the diameter of the connecting-post 28 on which it is positioned to thereby prevent the device from resting loosely on the upper surface of the connecting-strap 26. This will prevent bouncing or rattling, and possibly eventual destruction of the device. The location of the code device with reference to the level of the electrolyte is also immaterial since the device is formed of an acid-resistant material and, therefore, will not be affected by the electrolyte. An acid-resistant material is used to also prevent a short circuit in the battery if, for some uncontrollable reason, the device, or a portion thereof, should break and fall into the battery element as a result of a defect in the formed device, or because of an excessive amount of vibration being transmitted to the device through the battery.

Figure 5:
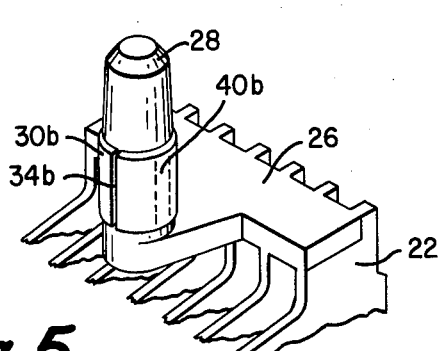
FIG. 5 is an isometric view also similar to FIG. 3 showing still another alternate form of the invention.
Figure 6:
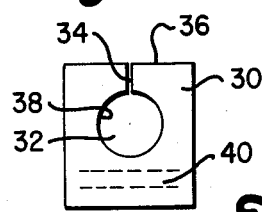
FIG. 6 is a top plan view of the preferred code device shown in FIGS. 1 and 2.

The location of the aperture 32 in the code device is such that ample space is available on a lateral portion of its surface to provide the device with an identifying mark, such as a serial number, date, or the like, as shown at 40 in FIGS. 5 and 6. Since the device might be submerged in the electrolyte, it is necessary that the mark be a permanent one, such as an acid-resistant paint or ink, or imprinted in the surface of the device by either an indentation or projection. The means to provide the identifying mark on the device forms no part of this invention since any one of several methods are satisfactory.

Figure 4:
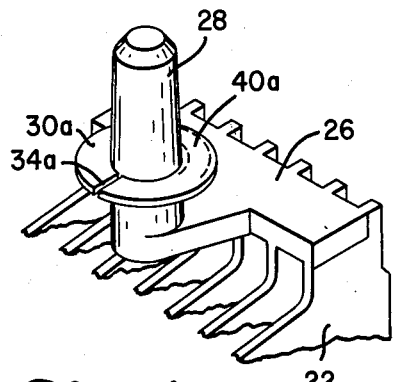
FIG. 4 is an isometric view similar to FIG. 3 showing an alternate form of the invention.

An alternate form of the invention is shown in FIG. 4 having substantially the same characteristics as the preferred form described hereinabove except for its overall configuration. In the drawing, a round code device 30a is shown which is provided with an expansion separation 34a and a space 40a for an identifying mark. The device 30a is also relatively thin, formed of an acid-resistant material, and similarly positioned on a cell element connecting-post 28 as is the code device 30.

Another alternate form is shown in FIG. 5, having still a different configuration, but with the same basic characteristics found in the other two forms. A tubular code device 30b is shown, also positioned on a cell element post 28, and is formed of a relatively thin acid-resistant material, is provided with an expansion separation 34b, and has a space 40b for an identifying mark, as found on the other two forms. The internal diameter of the device 30b is determined by and relative to the diameter of the post 28, so that the bottom edge of the device will not rest on the upper surface of the connecting-strap 26 of the cell element. This is to prevent the same problems that might develop as those related to the device 30, such as noise, breakage, or damage to the device or cell element.

The three configurations shown and described are representative of numerous other configurations that could be adapted for positioning on a cell element connecting-post. Also, numerous other mounting locations and relative configurations may be used within a storage battery for a code device, either on some portion of the cell element or on some portion of the container, without departing from the basic idea of providing a battery with an internal identification.

It is to be understood that the above detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a device of the class described, a storage battery with an enclosed chamber housing the battery elements and corrosive electrolyte, a coding member formed of corrosion-resistant material, removably positioned on one of the battery elements, and means on the member to attach the member to the battery element within the enclosed chamber of the battery during normal use of the battery.

2. The device defined in claim 1 further characterized by providing the coding member with a permanent means of identification relating to the battery and its characteristics.

References Cited by the Examiner

UNITED STATES PATENTS

| | | | |
|---|---|---|---|
| 2,051,345 | 8/36 | Reynolds. | |
| 2,667,525 | 1/54 | Hersch | 136—165 |
| 2,767,238 | 10/56 | Griner | 136—181 |
| 2,960,560 | 11/60 | Barke | 136—181 |

JOHN H. MACK, *Primary Examiner.*

JOSEPH REBOLD, *Examiner.*